Sept. 29, 1925.
E. T. McKAIG
1,555,225
MACHINE FOR PACKING ARTICLES IN BOXES
Filed March 27, 1924     10 Sheets-Sheet 1
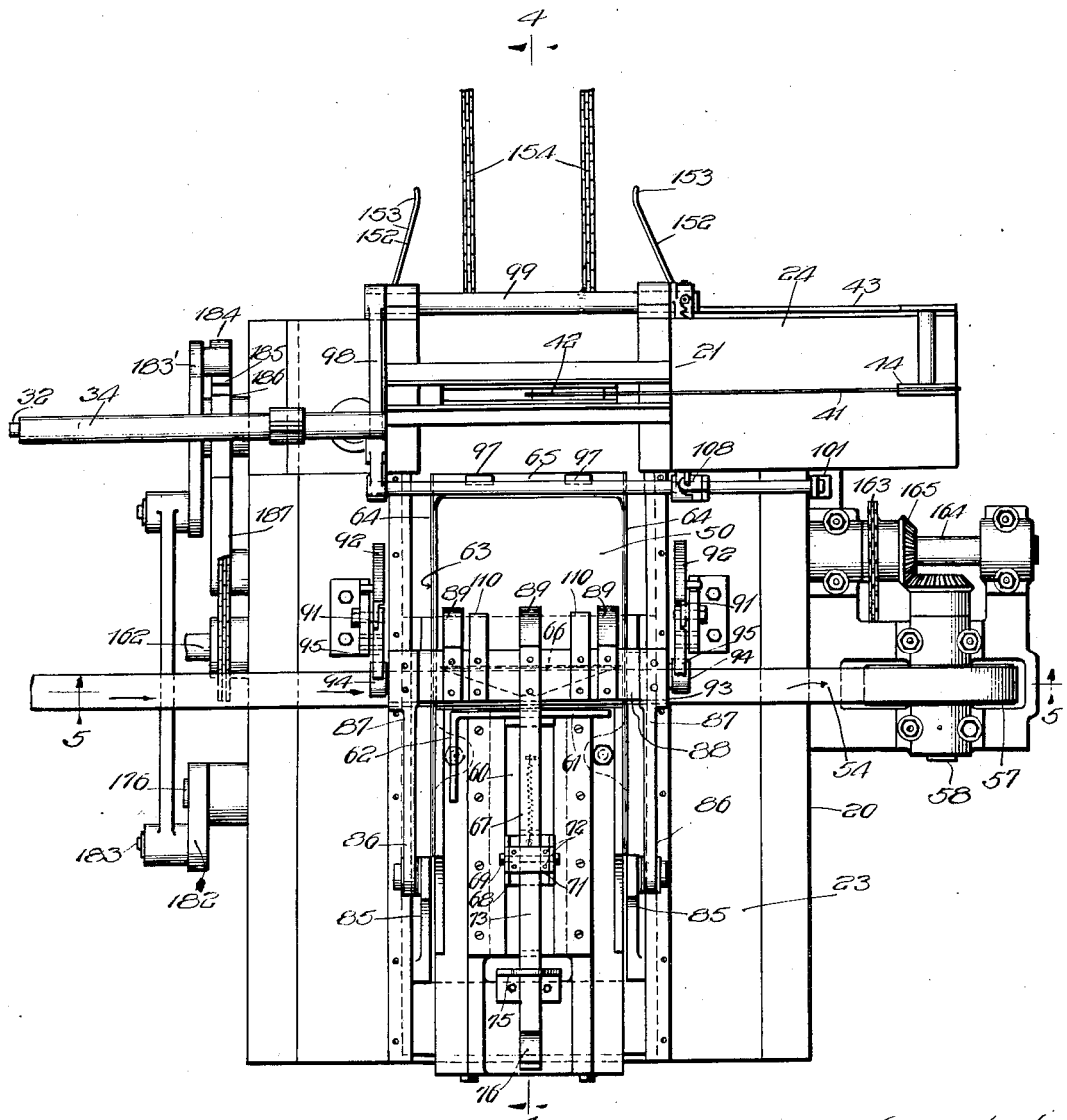

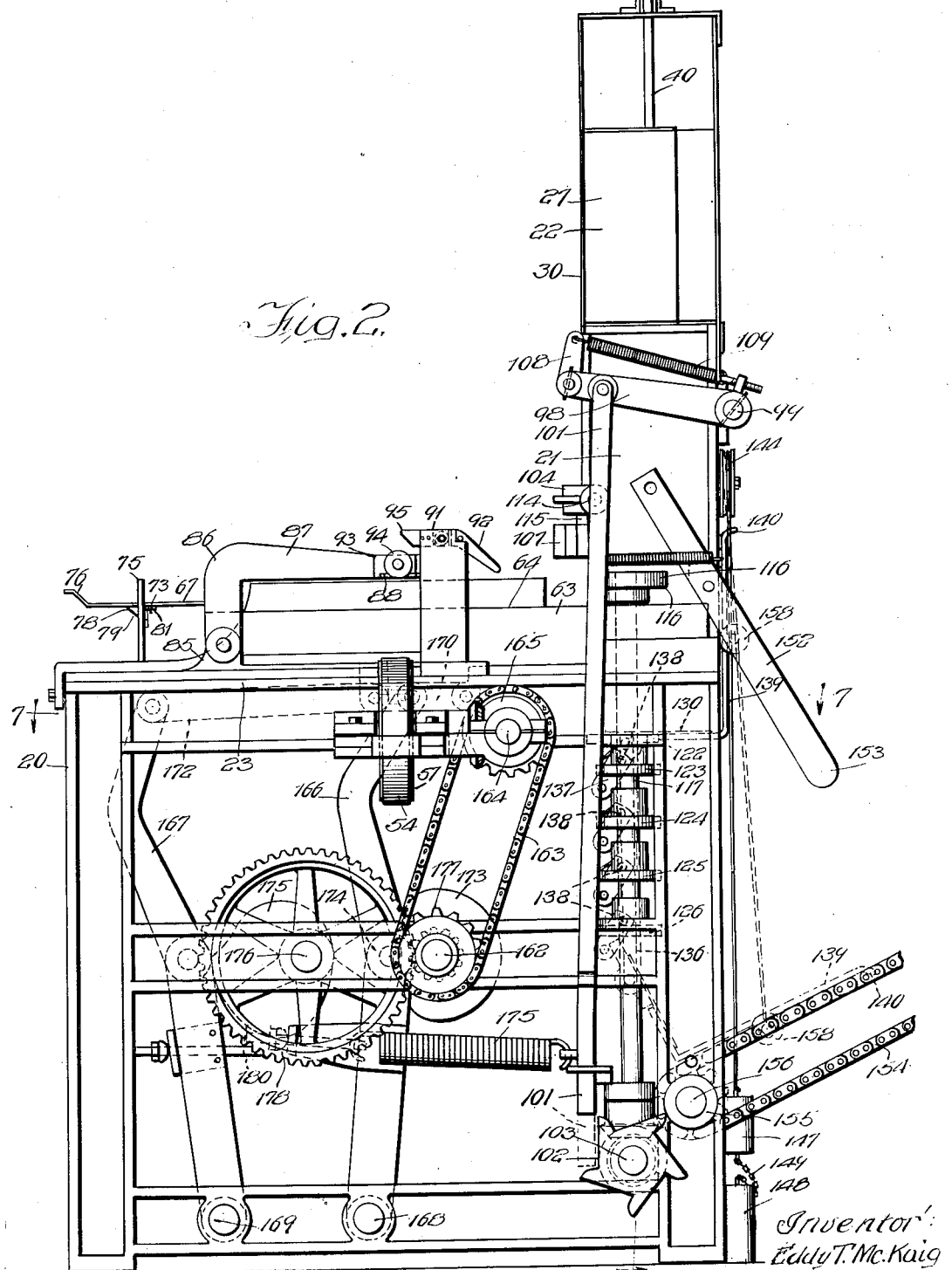

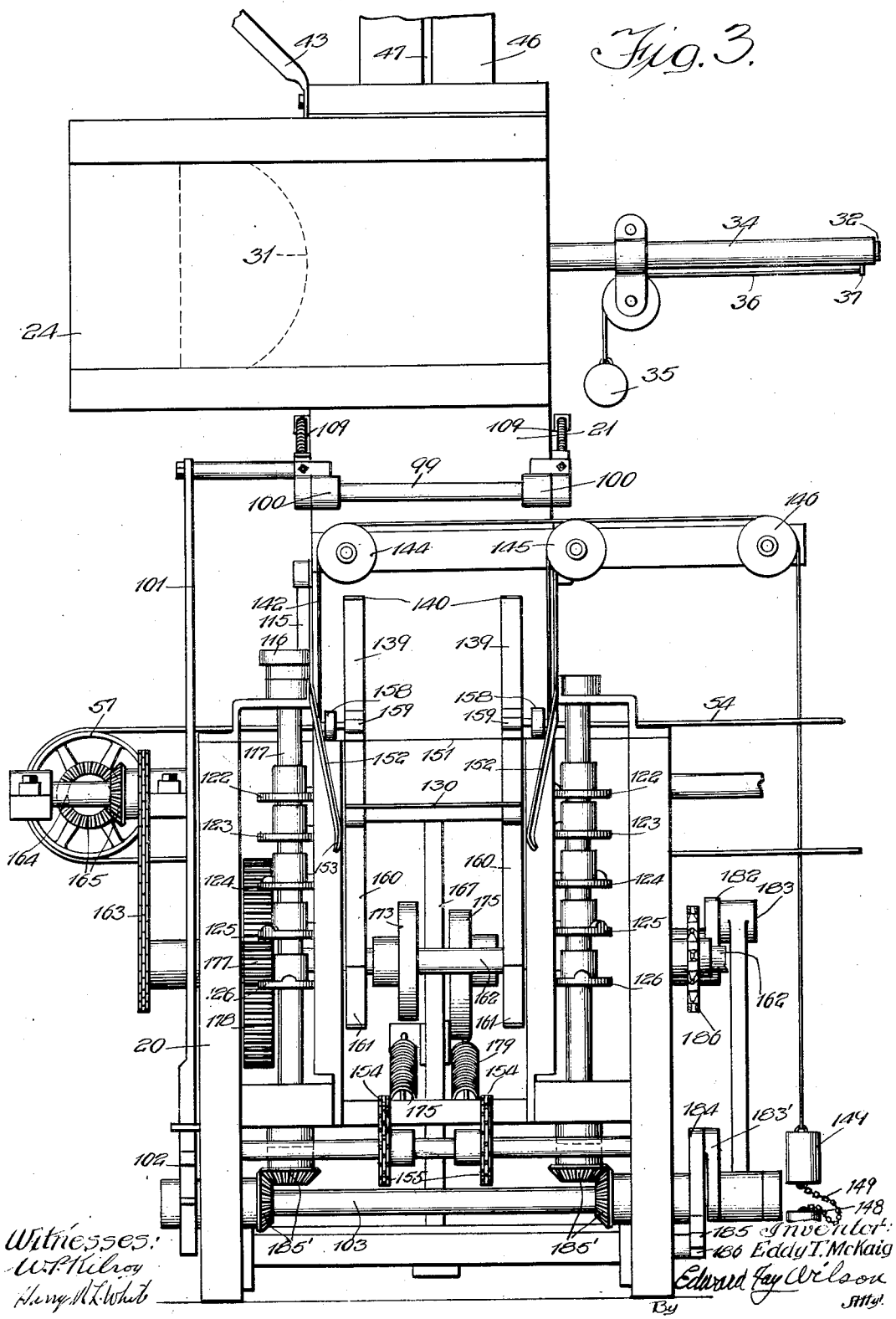

Sept. 29, 1925.
E. T. McKAIG
1,555,225
MACHINE FOR PACKING ARTICLES IN BOXES
Filed March 27, 1924    10 Sheets-Sheet 4
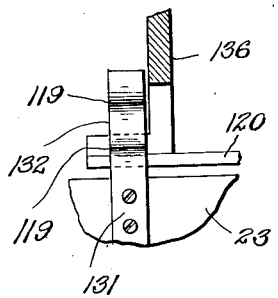
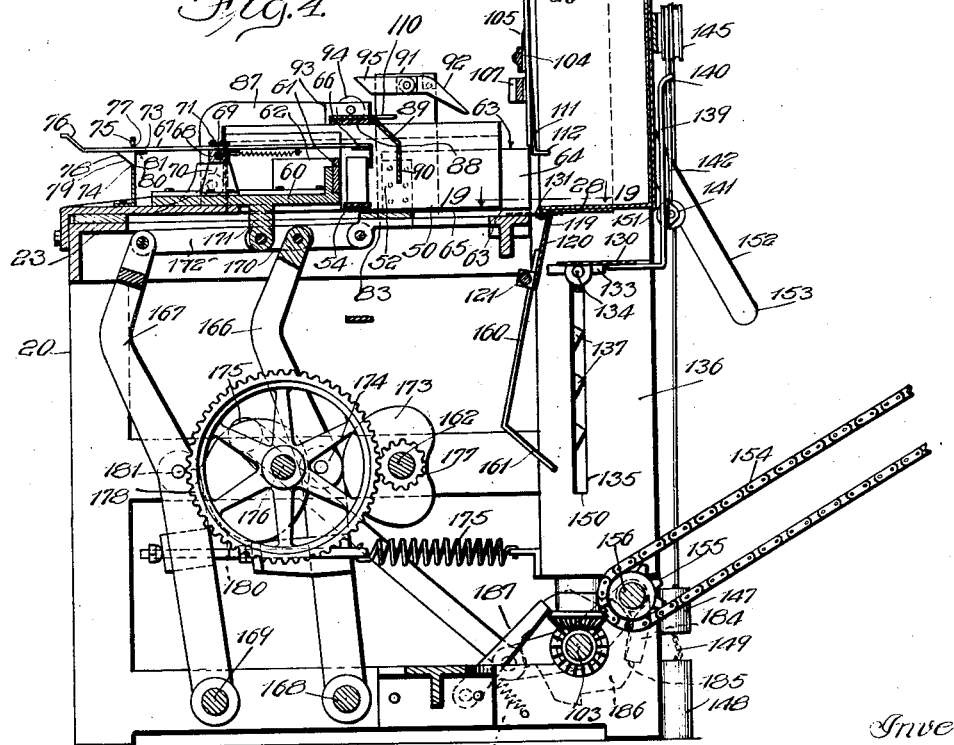
Witnesses:
W. P. Kilroy
Harry R. L. White
Inventor:
Eddy T. McKaig
By Edward Fay Wilson
Atty

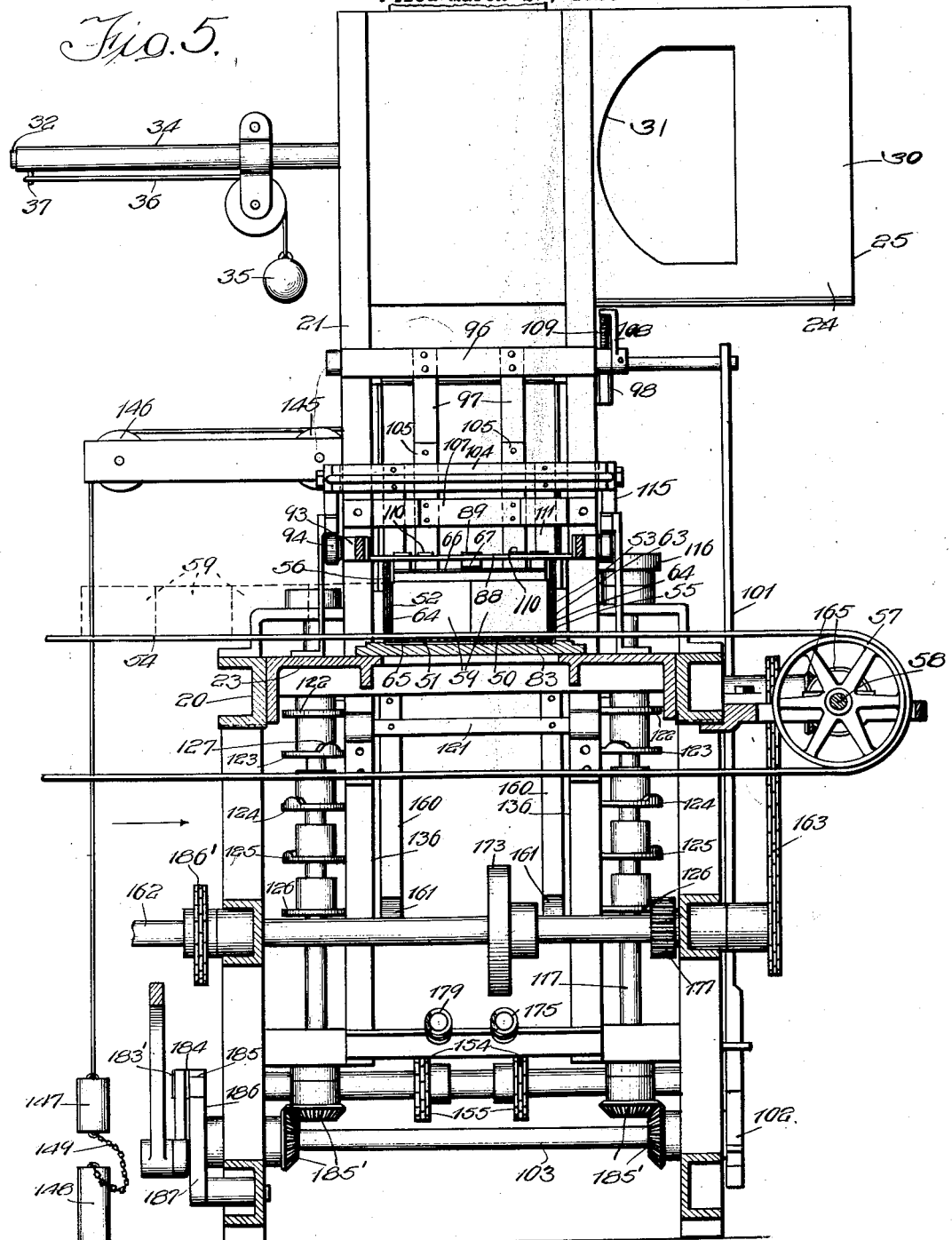

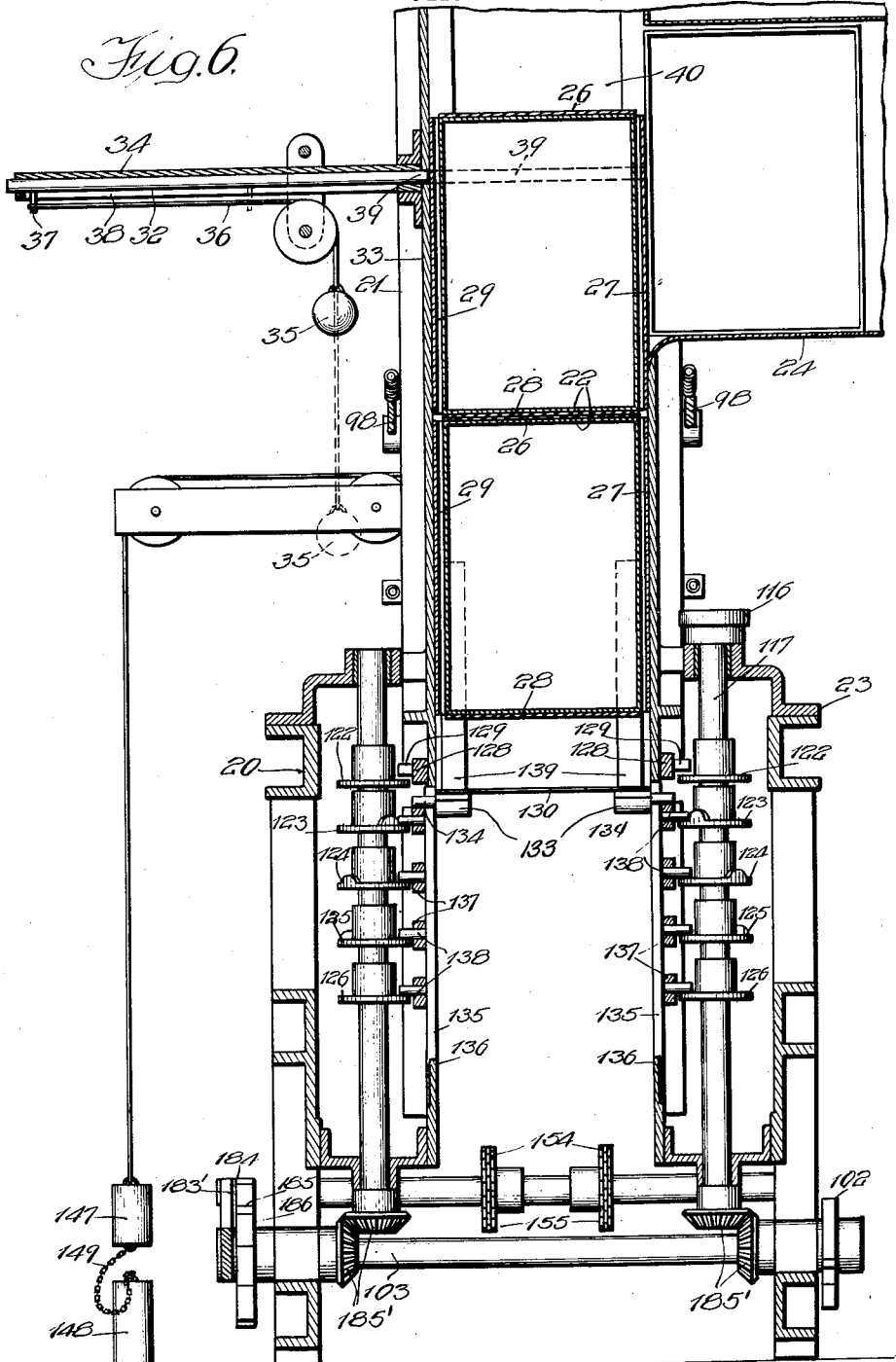

Sept. 29, 1925.  
E. T. McKAIG  
1,555,225  
MACHINE FOR PACKING ARTICLES IN BOXES  
Filed March 27, 1924  
10 Sheets-Sheet 7
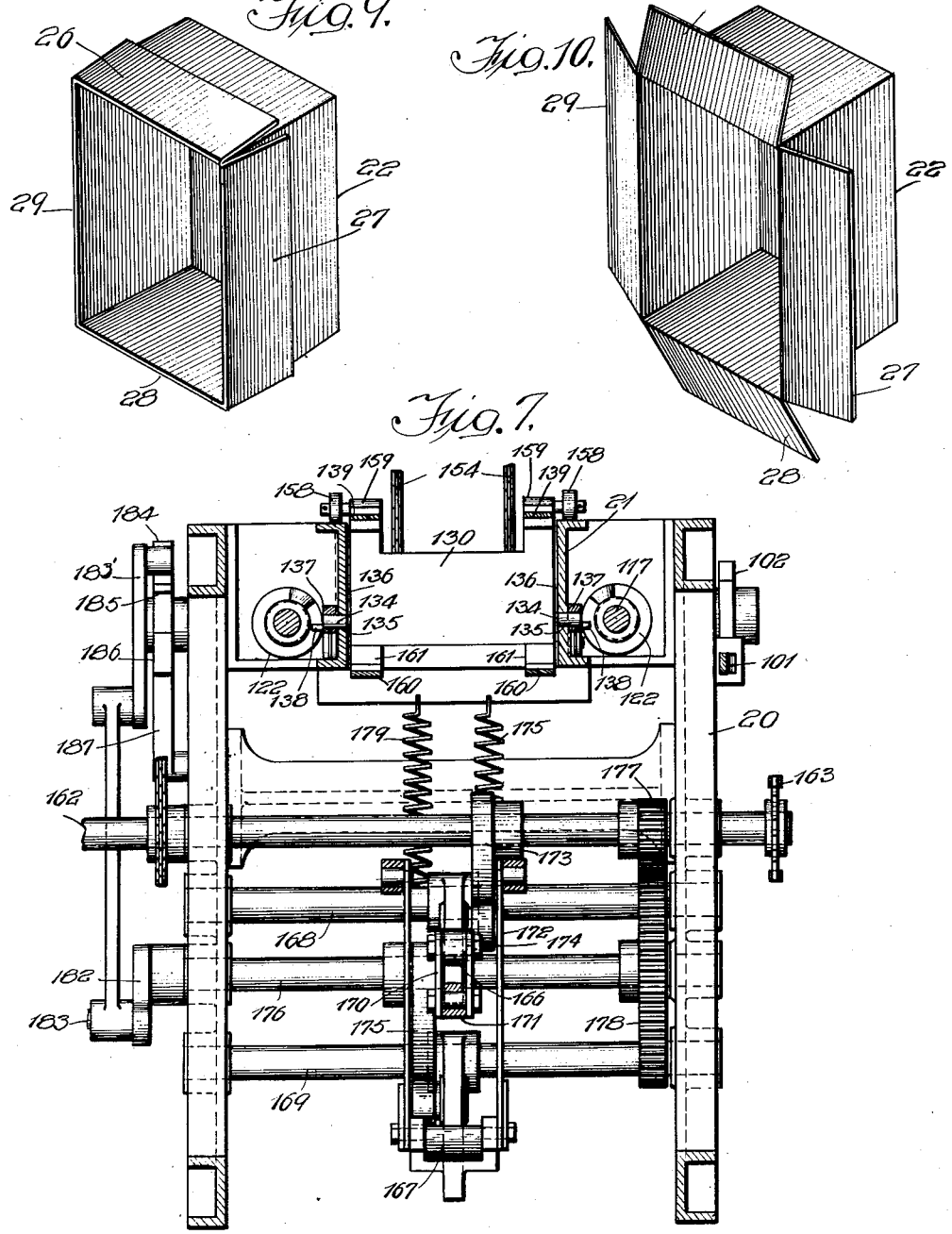
Witnesses:  
W. F. Kilroy  
Harry R. L. White  
Inventor:  
Eddy T. McKaig  
Edward Fay Wilson  
By           Atty

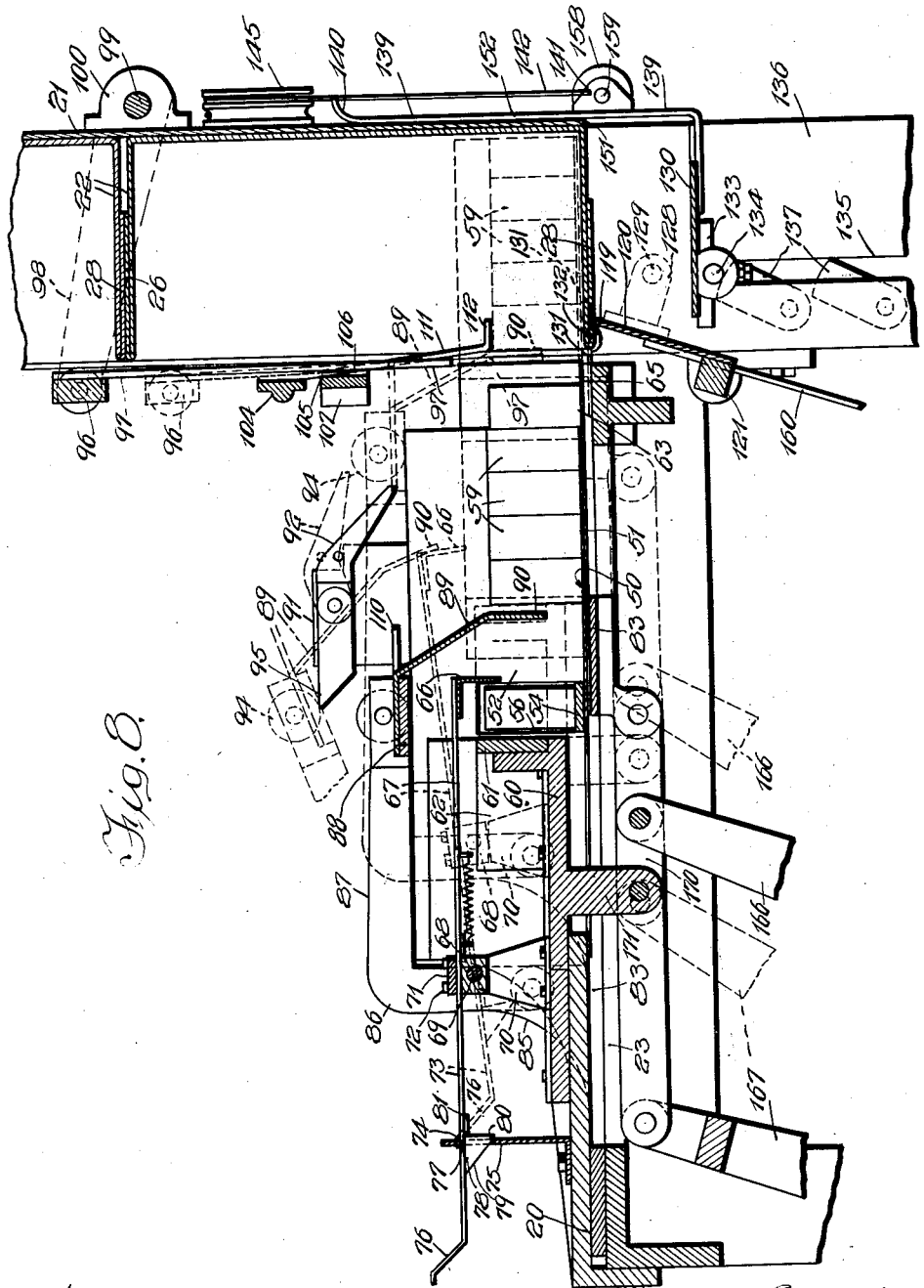

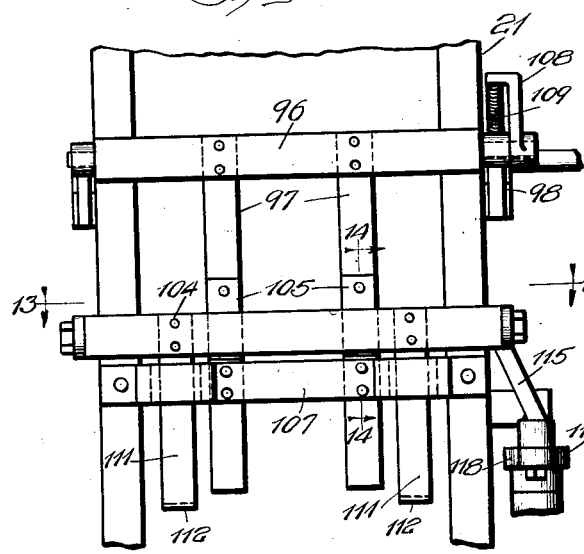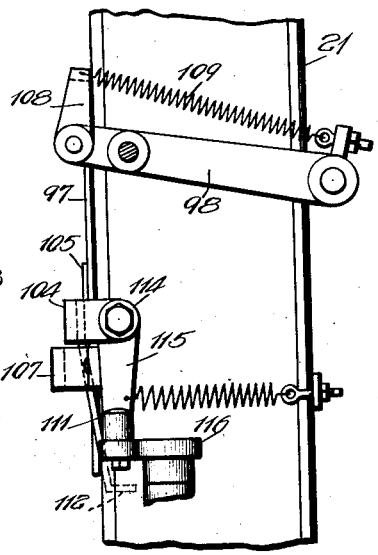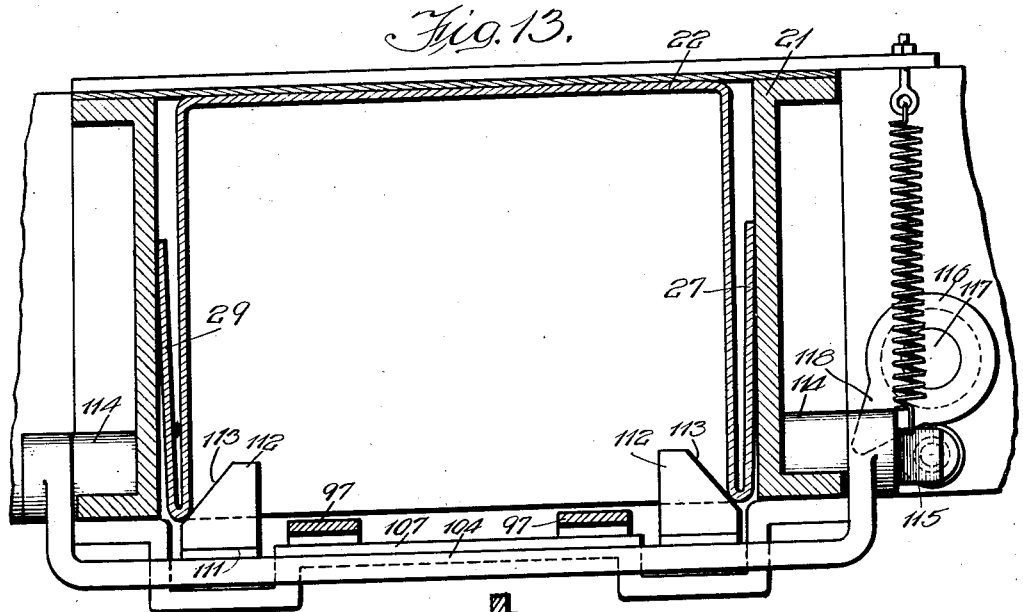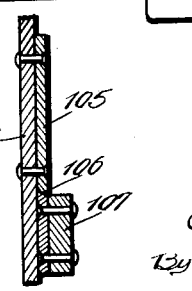

Sept. 29, 1925.
E. T. McKAIG
1,555,225
MACHINE FOR PACKING ARTICLES IN BOXES
Filed March 27, 1924    10 Sheets-Sheet 10
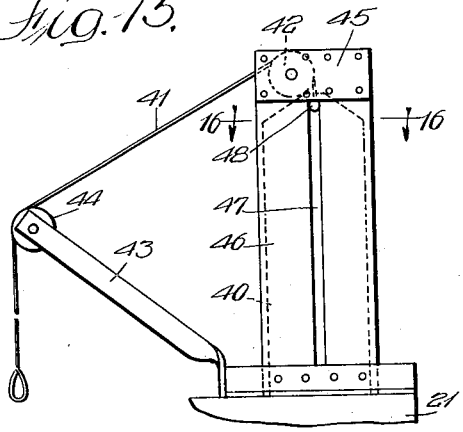
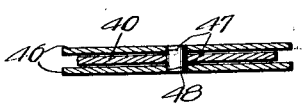
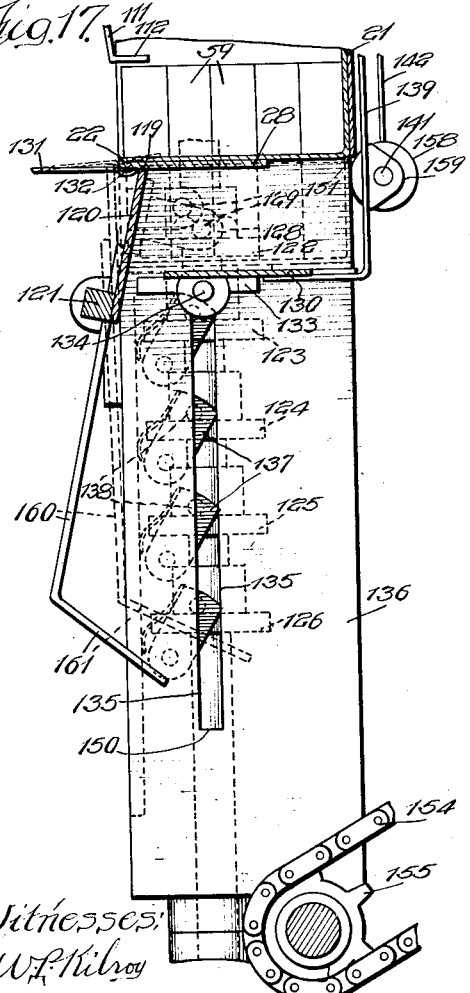
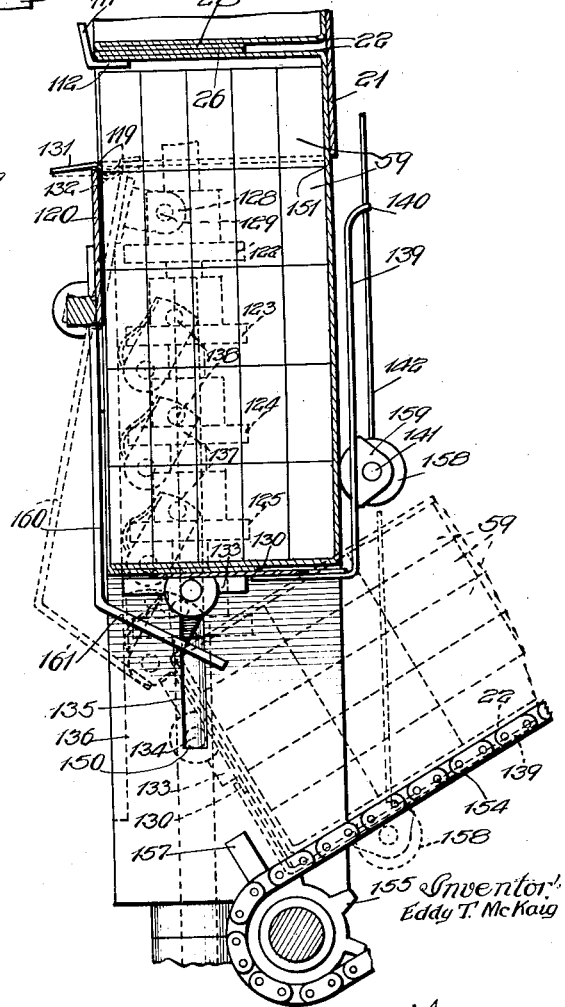
Witnesses:
W. F. Kilroy
Harry R. L. White
Inventor:
Eddy T. McKaig
By Edward Fay Wilson, Atty.

Patented Sept. 29, 1925.

1,555,225

UNITED STATES PATENT OFFICE.

EDDY T. McKAIG, OF CHICAGO, ILLINOIS, ASSIGNOR TO ANTON TRINI, OF CHICAGO, ILLINOIS.

MACHINE FOR PACKING ARTICLES IN BOXES.

Application filed March 27, 1924. Serial No. 702,247.

*To all whom it may concern:*

Be it known that I, EDDY T. McKAIG, a citizen of the United States, and resident of Chicago, in the county of Cook and State of Illinois, have invented new and useful Improvements in Machines for Packing Articles in Boxes, of which the following is a specification.

My invention relates to improvements in machines for packing articles in boxes and has special reference to an improved machine adapted to receive bars of soap from a wrapping machine, or a machine adapted to enclose the bars of soap in individual cartons and pack the bars of soap, as received, in corrugated boxes, having integral closure flaps.

The boxes which my machine is particularly adapted to fill are usually made of paper board in the form of a tube, having four closure flaps at each end, and are usually delivered to the operator of the machine in flattened form. The operator opens the boxes, one at a time, closing the flaps together at one end to form the bottom of the box, and swinging the four flaps at the opposite end outward and around against the walls of the box, to open the top so that the box can be filled. The machine is adapted to receive the boxes in the condition mentioned and feed them through, one after the other. The boxes are adapted to descend a chute, step by step, as the successive layers are completed, and when filled to be discharged from the machine.

I provide a carrier the width of the box and of capacity to hold a complete layer of the soap bars. I further provide a packing plunger which operates continuously to form layers successively of the articles, one after another, and each comprising a plurality of rows of the bars. I provide a carrier operator which operates when the layer is completed to force the carrier with the layer into the box and immediately withdraw it for the next layer. As the carrier is withdrawn the box is automatically lowered the depth of one layer ready to receive the carrier with the next layer. When the box is filled it automatically drops out of the machine and the following box drops into position to receive the carrier.

In the filling of such boxes in the manner described many difficulties had to be overcome; for instance, the top or closure flaps have to be positively restrained from swinging around to interfere with the proper operating of the machine. Another point, due to the yielding character of the walls of the boxes, is the necessity of retaining the walls properly positioned or spread to permit the free entrance of the carrier, and particularly when it places the top or last layer in the box.

Another feature of my invention relates to simple means for holding up the top wall of the box to facilitate the admission of the final layer. The boxes are fed through the machine on one side and consequently the open top is presented horizontally to the packing members, the filled boxes being tipped over, as they leave the machine, so that their open tops are presented uppermost.

My packing machine is arranged for attachment to a wrapping machine or a machine for placing articles, such as soap bars, in individual cartons or boxes, and is adapted to be operated at a speed to pack the wrapped articles delivered by the wrapping machine at the same speed as they are delivered from the wrapping machine.

My invention will be more readily understood by reference to the accompanying drawings forming part of this specification and in which:—

Figure 1, is a top plan view of my novel machine and which I have found best adapted for carrying out my novel method of packing articles in boxes;

Figure 2, is a side elevation of the machine looked at from the right of Figure 1;

Figure 3, is a rear elevation of the machine;

Figure 4, is a vertical sectional view taken substantially on the line 4—4 of Figure 1;

Figure 5, is a vertical cross-sectional view taken on the line 5—5 of Figure 1;

Figure 6, is a vertical cross-sectional view taken on the line 6—6 of Figure 2;

Figure 7, is a horizontal sectional view of the machine taken on the line 7—7 of Figure 2;

Figure 8, is an enlarged fragmentary vertical sectional view similar to Figure 4, and more clearly illustrating the layer forming and moving mechanism;

Figure 9, is a perspective view of one of the boxes as it is held open while in the machine;

Figure 10, is a similar view indicating that the closure flaps tend to swing outwardly to positions which would interfere with the proper operation of the machine;

Figure 11, is a fragmentary front elevation of the box chute, particularly illustrating the box and article restraining devices;

Figure 12, is a fragmentary side elevation of the part shown in Figure 11;

Figure 13, is an enlarged horizontal sectional view of the box chute on the line 13—13 of Figure 11;

Figure 14, is a detail vertical section on the line 14—14 of Figure 11;

Figure 15, is a fragmentary side view of the upper part of the box chute, particularly illustrating the weight for pushing the boxes down the chute;

Figure 16, is a detail horizontal section on the line 16—16 of Figure 15;

Figure 17, is a fragmentary side elevation of the machine, particularly illustrating the box lowering and discharging mechanism;

Figure 18, is a vertical sectional view showing the parts illustrated in Figure 17 in other positions; and Figure 19, is a fragmentary horizontal section on line 19—19 of Figure 4.

In said drawings, 20 illustrates a suitable framework somewhat in the form of a square table and adapted to carry all of the operating mechanism. Rising from one end of the top of the frame is a vertical chute 21, down through which boxes 22 move past the packing mechanism, the packing plungers of which are arranged upon the table top 23. The boxes enter the upper end of the chute 21 from a horizontal receiving chute 24 which extends out sidewise, its free end 25 being open, and into which the operator can easily place the boxes.

In order to give a clear comprehension of the several problems connected with controlling the several closure flaps of the boxes, as the boxes pass through the machine, attention is directed to Figures 9 and 10. Figure 9, is a perspective view of one of the corrugated boxes 22 with the several closure flaps 26, 27, 28 and 29, folded clear back against the side walls of the box in the condition in which the flaps are as the boxes pass through the two chutes. Figure 10 is a similar view of one of the boxes showing the several flaps partly swung around toward their closing positions and which illustrates the inherent tendency of these flaps to swing out of their poistions, as shown in Figure 9. These four closure flaps must be held swung back towards the sides of the box at all times, at least far enough so that they will not hinder the proper, consecutive and end to end contact, feeding of the boxes through the machine.

The boxes 22 are placed sidewise in the chute with the side flap 29 in advance, and I cut away the front wall 30 of the horizontal chute 24, as shown at 31, Figure 3, to permit the operator to insert a hand and swing the rear flap 27 down and hold the forward flap 29, folded back, until the entering box contacts with the box next ahead of it in the chute. The top and bottom walls of the chute 24 hold the top and bottom flaps 26, 28 swung clear back. These boxes are shoved into the horizontal chute 24 by hand against the box which is in the top of the vertical chute and the boxes, by reason of the friction produced by the top and bottom flaps, remain at the point to which they are pushed. When the box is placed in the chute 24 the open side or top of the box is presented horizontally toward the front of the machine, so as to receive the articles from the packing mechanism which is located on the table top 23. The boxes after they are pushed into the upper end of the vertical chute begin to travel down this chute, and I so arrange it that there are practically always two of the boxes in the vertical chute, the lower one being filled and the upper one in end to end contact with the lower one and descending in consonance therewith. The upper box in the vertical chute having dropped down to a point where the next box can be inserted from the horizontal chute, there being a box already in the horizontal chute, the operator enters the next box into the open end of the horizontal chute, holding the contacting flaps 29 and 27 folded back to let the boxes properly contact with each other, pushes the last box forcibly against the forward box and pushes it into the top of the vertical chute. At this time the next lower box has dropped far enough so that its upper end is below the bottom of the horizontal chute, but it is not far enough down to permit the lower end flap 28 of the box which is entering the vertical chute to swing out far enough to be any detriment.

One point, however, must be taken care of during the movement of the box into the upper end of the vertical chute; that is the forward side flap 29 must be held against swinging forward, for if it were not held back it would swing around forward far enough so that it would contact edgewise with the far wall of the vertical chute and prevent the box entering to its proper position. For the purpose of holding this forward flap 29 properly folded back, I provide a horizontally movable pusher rod 32 mounted in the far wall 33 of the vertical chute 21. This pusher rod is mounted and guided in a fixed tube 34 and is normally held at the inner limit of its movement by a weight 35 connected by a cord 36 to a projection 37 on the rod 32, near its outer end, and which projection projects through a longitudinal slot 38 extending the length of the lower side of the tube 34. The inner end 39 enters the upper end of the vertical chute 21 and is adapted to be projected across the vertical chute to contact with the next box in the horizontal chute. In the position shown in Figure 6, this pusher rod has been forced back as far as it can go, but as soon as the box against which its inner end is contacting drops down sufficiently, the rod will be automatically forced inwardly until it contacts with the forward flap of the next succeeding box in the horizontal chute. The arrangement is such that this inward movement of the pusher rod occurs before the upper box in the vertical chute has dropped far enough to free the forward flap of the next succeeding box. This action is indicated in dotted lines in Figure 6. After the pusher rod has entered into contact with the flap 29 of the next succeeding box and after the upper box in the vertical chute has dropped down beyond the floor of the horizontal chute, then the operator pushes the next succeeding box into the upper end of the vertical chute by forcing a third box into the open end of the horizontal chute, as explained before. The upper box in the vertical chute being light will not drop of its own accord, but has to be forced down to follow the box which is being filled. For this purpose, I provide a hanging weight 40 arranged at the top of the vertical chute and depending from a cable 41 trained over a sheave 42, which is led out to a convenient point through a hole in a guide bracket 43 and provded with a handle 44, by which the operator can readily lift the weight 40. The sheave 42 is carried on a support 45 mounted on guide plates 46 upstanding from the top of the machine and between the weight 40 which, in the form of a flat plate, is guided. The guide plates 46 are provided with central vertical guide slots 47, in which the ends of a guide pin 48 fixed in the upper end of the weight 40 are received. This weight is quite long and it is adapted to rest upon the upper end of the top box in the vertical chute and force the boxes down this chute. Furthermore, this weight also rests upon the top flap 26 of the top box and holds it swung back until such time as the next succeeding box is in position to prevent the forward swinging of this top flap.

The operation of entering the boxes is as follows: As the boxes descend the vertical chute the pusher rod is first freed and slides in against the forward flap 29 of the next box in the horizontal chute, then as the boxes descend still further, the top end of the upper box finally falls below the floor of the horizontal chute, at this time, having a position substantially that of the lower box, as shown in Figure 6. At this time the operator pushes another box into the horizontal chute, thus forcing the box immediately ahead thereof into the upper end of the vertical chute. This inner box is free to move inwardly several inches, that is far enough to overlap the box immediately below it in the vertical chute, and in which position it serves to hold the top flap 26 of the box beneath it from swinging around to block the chute. When this box is thus part way into the vertical chute the operator lifts the weight 40 by means of the cable, and while the weight is held up to clear the chute the operator pushes the boxes through the horizontal chute until the inner one is wholly in the vertical chute. Then the weight 40 is released and it rests upon the upper end of the box and in position to hold down the top flap and to force the boxes down the vertical chute.

It should be understood that the opposite side or bottom of the box has four flaps similar to the closure flaps, 26, 27, 28 and 29, and that the operator closes these flaps down to form the bottom of the box before the box is entered into the horizontal chute, and that thereafter the rear walls of the chutes hold these flaps in their folded down positions until the box is released from the machine, and means, to be described, are provided for preventing these flaps swinging outwardly when the box is released from the machine. The lower end of the lower box, as shown in Figure 6, is opposite to the packing mechanism in position to receive the first layer of the articles to be packed therein. The lower box in Figures 4 and 8 is in this same position.

The packing mechanism comprises an inner sheet metal U-shaped trough 50 in horizontal position on the table top 20. This trough has a bottom 51, a left hand wall 52 and a right hand wall 53. A carrier belt 54 is guided over the bottom wall 51 through an opening 55 in the lower part of the right hand wall 53 and through the lower end of a vertical opening 56 in the left hand wall 52. This belt is trained around a belt pulley 57 mounted on a horizontal shaft 58, suitably carried at one side of the machine, and leads from a wrapping machine, not shown. The belt is adapted to receive the articles, such as wrapped soap bars 59, from the wrapping machine and convey them in an end to end relation, as shown in Figure 5, to the packing machine. The articles enter the U-trough 50 through the slot 56 in end to end relation on the carrier belt 54 and are stopped by the far wall 53. The width of the trough 50 corresponds with the length of the several articles, which, in end to end relation, make up a row. In the present instance the trough is equal in width to the length of two of the articles. In the rear part of the trough 50 is mounted a plunger member 60, Figure 8, provided with a transverse head 61, having a rearwardly projecting extension 62 at one end, adapted as the plunger moves forward from its position, as shown in the drawings, to push the formed row of articles forward into the machine, to close the opening and prevent any articles entering until the plunger has been drawn back again for another stroke. It should be understood that the function of this plunger 60 is to successively push rows of the articles forward in the trough 50. This plunger moves forward and back continuously, at each forward movement pushing a row of the articles forward, and at each backward movement opening the gate for the reception of the next row of articles. The means for operating the several parts of the mechanism and for co-ordinating their movements to produce the results desired will be described hereinafter.

Surrounding the trough 50 is a second similar trough 63, having vertical sides 64, joined by a flat bottom 65. The inner trough 50 telescopes with the outer trough 63. The outer trough has a back and forward movement that is longitudinally of the troughs and similar to the back and forth movement of the packing plunger 60.

The boxes 22, as indicated in Figure 8, are each adapted to receive several layers of the articles, one above the other, and the function of the outer trough 63 is to carry a layer of the articles, comprising several rows, as an entity, into the box, and deposit them there. As has been explained, the articles are moved forward, a row at a time, in the inner trough 50, and of course the inner trough being within the outer trough, they are likewise moved forward in relation to the outer trough. When sufficient rows have thus been collected to form a layer, in the present instance, five rows, that is ten of the articles, the outer trough 63 is moved forward from this position, shown in full lines, Figure 8, to its packing position, shown in dotted lines, within the box being packed, and means are provided for retaining or holding the articles within the box as the trough 63 is withdrawn.

In the forward packing movement of the reciprocating plunger 50 it is necessary to provide means to prevent the disalignment of the articles comprising the row being moved. It sometimes occurs that the row fits closely endwise in the trough 50 and this would tend to cause the row of articles being moved to buckle out of alignment. To prevent this action a transverse guard bar 66 is provided, arranged to depend slightly in advance of the normal position of the row of articles as they enter the trough 50 through the opening 56. This guard bar is movable up and down, and also has a forward and back movement with the plunger 60. The up and down movement is to permit the bar to pass over the articles as the plunger is withdrawn, and the forward and back movement is for the purpose of retaining the row of articles in alignment as they are moved forward in the trough 50. The bar 66 is rigidly mounted on the forward end of a swinging member 67. This member 67 is secured on a block 68, which is pivotally mounted on trunnions 69, mounted in the upper ends of upstanding brackets 70 secured on the rear end of the plunger 60. The member 67 is secured to the block 68 by a cap member 71 and screws 72. The rear end 73 of the member 67 extends rearwardly beyond the block 68 and projects through an opening 74 in the upper end of a fixed guide standard 75 upstanding from the rear part of the table top 23. The rear end portion 76 of the member 67 is bent upwardly on an angle and is adapted, as the plunger with the member 67 moves forwardly, to push the rows of articles forward in the trough 50, to strike the upper wall 77 of the opening 74 in the standard 75, and depress the rear end of said member 67, and thus cause the forward end of the member 67 with the bar 66 to rise, as shown in dotted lines in Figure 8, clear of the articles being packed. For again throwing the bar down to its article holding position, as shown in full lines in Figure 8, there is provided a cam block 78 secured on the lower side of the rear part of the member 67, and having a rearwardly and upwardly inclined rear face 79 adapted to ride up on the lower wall 80 of the opening 74 and force the rear end of the member 67 upward and the forward end with the bar 66 down. To prevent the bar 66 being moved too far to the rear where it would interfere with the free entrance of the articles, there is provided a stop projection 81 on the cam projection 78 adapted to contact with the standard 75. The stop 81 and its function is desirable on account of the necessary free and possible slack movement of the various parts and the sharp reciprocating movements to which the packing plungers are subjected. A light pull spring 67' is attached at one end to a projection on the lower side of the bar 67 and at the other end to the standard 68, to provide a steady down pull on said member to make certain that it drops the holder plate 66 as permitted.

In the operation of the packing plunger 60 the articles are pushed forward a row at a time, and this action is continuous. When a sufficient number of rows have been thus pushed forward, in the present instance, five rows, the outer U-shaped trough 63 is moved forward into the box, and I provide cooperating means to carry the whole formed layer forward out of the inner trough into the outer trough and with it into the box. For moving the outer trough 63 forward and back I secure this trough to a reciprocable member 83, mounted in a suitable guide on the table top 23, and movable back and forth by means to be described. The member 83 extends rearwardly from the rear end of the trough 63, and on its rear end 84 there is provided two upstanding brackets 85 on which the rear ends 86 of forwardly extending arms 87 are pivoted. The forward ends of these arms carry a transversely extending plate or bar 88 which rigidly connects these arms. This plate or bar 88 extends horizontally across above the packing troughs already described, and being connected, as described, with the outer trough 63 moves back and forth with this trough. For pushing the formed layer forward there is provided a number of flat fingers 89 rigidly mounted on the cross bar 88 and extending forwardly and downwardly, their free ends 90 being bent to hang down vertically and arranged to drop in immediately to the rear of the rear end of the formed layer, as shown in full lines in Figure 8. In this position when the member 83 is moved forward the pushers 89 engage the rear end of the layer and push it out of the inner U-shaped trough into the outer U-shaped trough and with the outer trough into the box. Upon the rearward movement of the member 83 for withdrawing the trough 63 from the box, the next layer being partly formed, it is necessary to lift the fingers 89 and also to hold them up until the next layer is completely formed. For this purpose there is provided a cam track 91 at each side of the table, having forwardly extending pivoted parts 92, which extend downwardly and forwardly. Upon the forward ends 93 of the arms 87 I provide cam rollers 94, one at each side, adapted to ride up the members 92 as the packing member is withdrawn from the box and lift the arms 87 and the pusher fingers 89 as shown in dotted lines, Figure 8. For the purpose of retaining the fingers 89 elevated and out of the way of the layer being formed, until it is completed, there is provided a rearwardly extending projection 95 on the tracks 81 and in the rearward movement of the member 83, which carries the arms 87, the rearward movement is arrested with the rollers 94 resting on these projections. When the time arrives to force the formed layer into the box the first movement of the member 83 is slightly to the rear to pull the rollers 94 off of the projections 95 and let the fingers 89 drop in behind the layers. The means for producing the several coordinated movements of the several parts will be described later. After the layer has been inserted into the box, and while the trough 63 is being withdrawn, it is necessary to hold the layer from being withdrawn with the trough. For this purpose I provide a stop device comprising a cross bar 96 extending across the face of the chute 21 and having depending fingers 97 secured rigidly thereto. These fingers are spaced between the pusher fingers 89 and are adapted as the bar 96 is moved down to be brought down in front of the inserted layer and hold it in the box. The bar 96 is pivotally mounted at its ends in the forward ends of vertically swinging levers 98. These levers are mounted at their rear ends on the ends of a transverse shaft 99, which is mounted to oscillate in suitable bearings 100 secured to the back of the chute 21. These levers are adapted to be moved up through the medium of a depending pusher rod 101. This rod hangs down at one side of the machine, and its upper end is pivoted to one of the levers 98 between its ends and is adapted to lift the bar 96 when the lifting rod or plunger 101 is lifted. The plunger 101 is guided through suitable openings in the frame and it is adapted to be lifted by a toothed wheel 102, Figure 2, which is mounted on a horizontal shaft 103 near the bottom of the machine. It will be obvious that the bar 96 will be lowered by gravity, and there is provided latch means for retaining it in lifted position, once it has been lifted, until it is released for the purpose of letting the stop fingers 97 drop down behind the inserted layer. This latch means comprises a horizontal guide bar 104 adjustably mounted on the face of the chute 21, below the bar 96 and between which and the face of the chute the fingers 97 depend. The adjustable mounting of bar 104 is for a purpose subsequently stated. Fixed to the backs of the fingers 97 are latch plates 105, having beveled lower ends 106 adapted to engage over the top edge of a similarly formed stops fixed to the inner surface of a second cross bar 107 fixed to the face of the chute 21, below the bar 104, see Figure 14. For the purpose of causing these latch plates to engage when the plunger 101 is lifted, there is provided an upwardly extending arm 108 fixed to one end of the cross bar 96. The free end of the arm 108 is connected by a pull spring 109 to the rear end of the arm 98. This spring 109 tends to hold the free lower ends of the stop fingers 97 outwardly and causes the latch stops to engage and hold the fingers elevated and out of the path of the layer of articles as the same is inserted into the box. For permitting the fingers to descend and hold the inserted layer in the box unlatching means are provided. This unlatching means consists of forwardly extending straight pushers 110 carried by the cross bar 88, which engage the lower ends of the fingers 97 just as the layer inserting plunger approaches the inner limit of its movement. The fingers 97, having been pushed off of the latch plates 105, the bar 96 with the fingers 97 drops down by gravity projecting the lower ends of the fingers behind the layer just inserted.

The boxes 22, having yielding walls, necessarily vary somewhat as to dimensions, and in order that the movement of the boxes down the chute 21 may be assured, the chute is made wider than the boxes. This necessitates some means of centering the boxes transversely in relation to the packing mechanism, particularly for the reason that frequently the layer fits quite tightly transversely in the box. Furthermore, when it comes to the insertion of the last or top layer, the upper wall being yielding sometimes due to the weight or pressure of the packed articles, these top walls would tend to drop down and hinder the free entrance of the last layer.

For the purpose of centering the boxes and for holding up the top wall at the time of the insertion of the top layer, there are provided centering arms 111 rigidly mounted at their upper ends on the cross bar 104 and depending to a point just above the top surface of the inserted layer where they are bent to project inwardly, as shown at 112. These lower hooked ends 112 are inclined on their outer edges 113 and these members are arranged to engage the two sides of the box being filled and center the box in relation to the packing meachanism. As these hooked ends lie just above the top surface of the inserted layer, they are in position to engage the top wall of the box at the time of the insertion of the top or last layer and hold this wall up out of the way of this last layer as it is pushed into the box. The last layer having been inserted it is necessary to withdraw the centering lower ends 112 of the centering arms. For this purpose the bar 104 is mounted on bearings 114 at its ends and downwardly extending arms 115 rigid with the bar are provided, and the lower ends of these arms project adjacent to cams 116 carried on the upper ends of vertical shafts 117, arranged one at each side of the machine. The weight of the bar and its arms tends to hold the arms in contact with the cams, and once for each box the cams are adapted to push the arms away from the chute, thus pulling the centering members out of the box. The cam projection 118 which causes this action is quite sharp, so that immediately the centering projections are withdrawn from the upper end of one box they swing into the lower end of the next succeeding box and center it, see Figures 11, 12 and 13. The box being filled is supported at the proper height on the upper edge 119 of a transversely extending plate 120. This plate, during the insertion of the first layer, is positioned beneath the forward portion of the lower end wall of the box, as best shown in Figure 8. After this first layer has been inserted it is necessary to withdraw this support to permit the box to drop or be forced down into position to receive the second layer. This support plate 120 is rigidly mounted on a cross bar 121, which is mounted in suitable bearings at its ends to swing the plate forward and back, and means are provided for positively withdrawing the plate and other means subject to action by the filled box for swinging the plate inwardly beneath the next succeeding box as the filled box drops out of the machine.

The vertical shafts 117 are what I term the cam or box dropping shafts and there are provided a vertical series of cams 122 to 126 inclusive on each shaft. Each of these cams has a cam projection 127 adapted to provide a lifting action for unlatching the box supporting elements and permitting the box being packed, to drop a predetermined amount after each layer has been inserted.

The plate 120 carries inwardly extending arms or projections 128, one at each side provided, adjacent to their free ends with cam pins 129 adapted to be engaged by the cam projections 127 on the upper cams 122. This engagement swings the free ends of the arms 128 upward and the plate 120 outward to disengage the box which has been resting on the upper edge of the plate, whereupon the weight of the partly filled box, with the addition of the weight 40 resting upon the upper end of same, causes the partly filled box to slide down in the chute 21 until it rests upon a box support and lowering plate 130, which is arranged at a height to support the box with the top surface of the first inserted layer just far enough down to freely admit the packing trough 63 with the next layer. The full function and operation of the support plate 130 will be described later.

It is desirable to apply some slight holding force on the plate 120 to definitely retain it in and out of box supporting postion. Simple means for this purpose comprises flat yielding members 131, see Figures 17, 18 and 19, one at each side of the machine, secured to the machine frame and projecting over the top edge 119 of the plate 120 and each having a rounded projection 132 on its lower side, past which the plate is sprung in its forward and back movements, the members 131 yielding sufficiently to permit this movement. The plate 120 having been swung out by the upper cams 122 and having permitted the box with the first layer to fall upon the support 130, the plate 120 remains in its outer position until that box is filled and is ready to tip out of the machine. The plate 130 is secured upon the top of bracket members 133, which are provided at their outer ends with horizontal guide pins 134 which project through vertical guide slots 135 in the side walls 136 of the machine. Outside of these side walls 136 the vertical cam shafts 117 are arranged. Adjacent to each of the cams 123 to 126, that is each of them below the first pair, there is provided a swinging lever or support strut 137 pivotally mounted at its lower end on the wall 136 and provided adjacent to its upper end with a laterally projecting pin 138. These support struts are arranged one adjacent to each of the cams 123 to 126 and tip over towards the cams normally with the pins 138, resting and riding on the top surface of the cam disks and in position to be engaged by the cam projections 127. These struts extend above the projections 138 and their free ends are preferably formed on a curve struck from the center of the strut pivot, and these upper ends normally lie in the path of the projections 134 on the ends of the bar 133, to which the plate 130 is secured, and serve to support the plate and the box being filled until the struts are swung out of the way to let the plate and box descend. The cam projections 127, as the cams rotate, engage the pins 138 of the struts and swing the struts to one side out of the path of the projections 134, the cams being arranged and timed to drop the box, step by step, after the several layers are inserted. It will be seen that the guide slots 135 are not central in the chute 21, but are arranged between the middle and the open side of the box, and means are provided for holding the plate 130 level to receive the box and while the box is being filled and lowered. This means comprises a pair of guide bars 139, which are each secured rigidly at one end to the plate 130 and are bent to lie up against the outer surfaces of the back wall of the chute 21. The extreme free ends 140 of these bars 139 are curved outwardly so that they will not mar the boxes as they leave the machine. For the purpose of yieldingly retaining the plate 130 and bars 139 in position, shown in full lines in Figure 8, there is provided a lifting counterbalancing mechanism, comprising a weight device connected by cables to the two bars 139 adjacent to their inner ends. For this purpose a block 141 is secured to each of the bars 139, near its lower end, and cables 142 and 143 are attached to these blocks which lead up over pulleys 144 and 145 respectively and out horizontally over a guide pulley 146, their outer ends being secured to a balance weight 147.

For a purpose, to be described, the weight 147 is not sufficient to fully counterbalance the plate 130, etc., but I provide a second weight 148 hung below the weight 147 by a flexible connector 149, preferably a short piece of chain. The function of this counterbalancing mechanism is not only to maintain the plate 130 level, but to lift the plate from its lowest position after a full box has been discharged and also to counterbalance to some extent the box as it is being filled and dropped, step by step, for successive layers. When the last layer has been inserted into the box the plate 130 with the box is released from the lowermost struts 137 and the projections 134 drop to the lower ends 150 of the guide slots 135. In this movement the upper end of the box descends below the lower edge 151 of the rear wall of the chute 21, and it is then free to tip backwards out of the machine. In this tipping movement it is supported on the plate 130 and by the bars 139, as in a cradle, and it tips rearwardly, the whole rotating upon the projections supported in the lower ends of the slots 135. To prevent the box falling out and down with too great force, means are provided to retard this action to some extent. This means consists in two yielding flat bars 152 which are secured at their upper ends to the side walls of the chute 21, to project downwardly, rearwardly and inwardly, and between which the box passes as it tips out. These spring pressure bars 152 are adjusted to engage the box between them with sufficient friction to prevent it falling with a blow. The extreme free ends 153 of these pressure bars are curved outwardly to avoid any marring of the boxes as they leave the machine. For conveying the boxes away from the machine there is provided a conveyor belt or chains 154 trained around suitable wheels 155 on a horizontal shaft 156, mounted in suitable bearings near the base of the machine. It should be understood that the guide bars 139 are spaced to fall outside of the chains 154. Suitable conveyor cleats 157 are carried by the chains 154 for engaging the boxes and carrying them to a suitable delivery point. To reduce the friction incident to the upward movement of the box support anti-friction rollers 158 are provided, mounted on studs 159 secured in the projections 141, to which the cables 142 and 143 are secured. These rollers engage the rear wall of the machine in the up and down movement of the box support. As the box is filling and being lowered the box support remains in its upright position, as shown in Figure 8, dropping step by step, as released by the several pairs of dropping cams, until it reaches its lowermost position, as shown in Figure 18, when the box tips out, as has been described, and is lowered gently upon the conveyor for removal from the machine. To assure the prompt tipping out of the filled box, once it has reached its lowermost position, and to move the support plate 120 inwardly beneath the next box above, operating bars 160 are secured to the plate 120 which project downwardly, and their lower ends 161 bent inwardly into the path of the lower end of the box as it descends, and these inwardly bent ends are adapted to be engaged by the box as it rests upon the next to the lowest pair of supports 137, so that as it drops off of these supports to the lower ends of the guide slots 135 the weight of the box tends to push the lower ends 161 to the left, Figures 4 and 18, and likewise force the plate 120 inwardly against the upper part of the box. This pressure of the plate against the box tends to force the upper end of the box out of the machine and initiates the tipping of the box referred to. Furthermore, as the box rotates on the support projections 134, its upper end is held in contact with the bottom of the next succeeding box and the plate 120 swings freely in beneath the next box in position to receive and support it properly for receiving the first layer of articles.

The particular function of the counterweight device for the box support is to ensure the quick return of the support to its uppermost position, once the filled box has been removed, and also to ensure the prompt dropping of the next box after the second layer has been inserted, at a time when the depressing weight 40 might be lifted for the insertion of another box into the upper end of the chute 21. For this purpose the box support is overcounterbalanced by the weights 147 and 148, and consequently the support is rapidly lifted from its lowermost position, the first action being to rotate it back to horizontal position with the rollers 158 against the back plate of the machine. Then after the support is pulled quickly upward, the several struts 137 swinging freely out of the paths of the projections 134, until the support nears the upper limit of its movement, when the lowermost weight 48 contacts with the floor and the flexible connector 149 permits the upper weight to descend still further. The strain of the lower weight, which is preferably heavier than the other, is thus taken off of the support so that when the box has descended the first step and rests upon it and is released after the insertion of the second layer, the weight of the support and the partly filled box is sufficient to cause the box to properly drop the next step. At this time the counterweight 148 is again picked up, but with the addition of the third layer of the box is heavy enough, so that this extra counterweight does not retard it detrimentally in dropping down the further steps.

The machine is driven by power applied to the horizontal shaft 162, which extends out at one side and is adapted to be geared to and derive power from the operating mechanism of an associated wrapping machine, which is in turn adapted to deliver the wrapped articles upon the belt 54 by which they are carried into this machine. The power shaft 162 is mounted in suitable bearings on the frame of the machine and is connected to drive the several power operated mechanisms. This shaft 162 is connected by a chain 163 to a short horizontal shaft 164, which in turn is operatively connected by a pair of miter gears 165 to the shaft 58, upon which the belt pulley 57 is mounted and by which the belt is driven at a proper speed relatively to the packing mechanism.

For operating the two packing members 60 and 83, swinging levers 166 and 167 are provided mounted on shafts 168 and 169 respectively to swing back and forth of the machine, and they are arranged with their upper ends below the top of the machine. The upper end of the lever 166 is connected by short links 170 to a projection 171, rigid with and extending down from the member 60. The upper end of the lever 167 is connected by relatively long links 172 to a projection extending down from the member 83, and as these levers swing back and forth the packing plungers and the outer U-shaped trough are operated. For operating the lever 166 there is provided a heart shaped cam 173 secured on the shaft 162, and the lever carries a cam roller 174 for contact with the cam. The lever is held with the roller in operating contact with the cam by a relatively strong pull spring 175, and the function of the cam is to force the lever rearwardly against the spring, the work of the plunger in packing the articles being accomplished by the spring, consequently it will crush anything and when the packing movement of the lever is prevented, no damage to the machine can result. The cam is so shaped that the lever is held for an appreciable time at the rearward limit of its motion, thereby giving the articles which are carried by the belt 54 an opportunity to be carried into the inner trough before the plunger starts forward and closes the opening through which the articles enter. The lever 167 is operated similarly by a cam 175 carried by a second shaft 176, parallel with the shaft 162, and geared to the shaft 162 by a pinion 177 on the shaft 162 and an intermeshing gear 178 on the shaft 176. These gears are arranged to rotate the shaft 176 once for as many rotations of the shaft 162 as there are rows of articles in each layer, in the present instance the ratio is 1 to 5, as there are five rows in each layer. In other words, the shaft 162 turns five times to one of the shaft 176, consequently there are five rows of the articles pushed forward to form a layer, and during this time the shaft 176 makes one revolution and the packing plunger with the outer U-shaped trough makes one movement back and forth. The cam 176 has one peculiarity; it is that when it forces the lever rearward against the pulling action of its holding spring 179, it is arranged to hold the lever stationary nearly at its most rearward position, in which position the rollers 94 rests upon the rear point 95 of the guide member 91 and holds the pusher plate 90 up out of the path of the articles being pushed forward by the plunger 60. The quiescent period is produced by the concentric portion 180 of the cam 175. Then at just the instant that the fifth row of articles have passed beneath the pusher plate 90, the lever 167 is suddenly moved rearward by the rise 181 on the cam 175 and the roller 94 drops off of the projection 95, allowing the pusher plate 90 to drop behind the formed layer and to push it into the box which it does while further rows of the articles are being pushed forward to form the next layer.

For operating the cam shafts 117, which make one revolution for each box filled, one end of the shaft 176 carries a crank 182, having a crank pin 183 which is operatively connected to a crank arm 183', which is mounted on the shaft 103 to swing around freely. This crank carries a pawl 184 adapted to engage ratchet teeth 185 on a ratchet-wheel 186 secured on the shaft 103. For each revolution of the shaft 175, by which a layer is inserted into a box, the ratchet-wheel is turned one notch and the number of the teeth in the ratchet-wheel corresponds with the number of layers required to fill a box, in this instance this is five. A retrograde movement of the ratchet-wheel is prevented by a holding dog 187, pivotally mounted on the frame and its free end is held in position to engage the teeth of the ratchet-wheel by a spring 188. This holding dog is free to swing out to permit the ratchet-wheel to be rotated by the dog 184. This shaft 103 extends across the machine beneath the cam shafts and is geared to both by suitable pairs of miter wheels 185'. By this means the cam shafts 117 are turned one revolution for each box filled and all of the operating parts of the machine are properly timed as to their relative movements. For driving the delivery chains 154 in time with the packing mechanism, a drive wheel 186' is secured on the main drive shaft 162, and a drive chain is trained over this wheel and over a similar wheel on a conveyor shaft, not shown, at the outer end of the conveyor. It is preferable to drive the conveyor from the outer end, as in this way the pull is applied to the tension side of the conveyor.

As many modifications of this invention will readily suggest themselves to those skilled in the art, it is desired that the scope of the appended claims be not limited to the specific constructions or steps herein disclosed and described.

I claim:

1. In a machine for packing articles in boxes, a belt for carrying the articles in end to end relation into the packing mechanism, a plunger operable back and forth continuously for moving the articles forwardly in the packing mechanism and at right angles to their direction of movement as they enter the mechanism, a stationary trough or chute for receiving the articles, a second plunger adapted for operation after a predetermined number of movements of the first plunger for engaging the articles and moving them forward in the form of a layer, a second trough or chute movable forwardly with the second plunger for receiving and carrying forward the layer of articles, and means for retaining the layer in its forwardly moved position while the second trough is withdrawn.

2. In a machine of the kind described, a packing mechanism operable to receive the articles to be packed in end to end relation, means for successively moving a predetermined number of the articles transversely out of their received position to form a layer, and mechanism for bodily moving the layer forwardly into a box while the next succeeding layer is being formed.

3. In a mechanism for packing articles in a box with yielding walls, a chute down which the boxes drop and in which they are adapted to present an open side to the packing mechanism, a packing mechanism adapted to assemble the articles in a layer and to insert each layer as an entity into a box, mechanism adapted to lower the box, step by step, to receive successive layers, and means for engaging the top wall of the open side of the box at the time of the insertion of the last layer.

4. In a mechanism for packing articles in a box with yielding walls, a chute down which the boxes drop and in which they are adapted to present an open side to the packing mechanism, means for automatically spreading and automatically centering the side walls of the box, a packing mechanism adapted to insert successive layers into the box, and coordinated mechanism for lowering the box, step by step, as successive layers are inserted.

5. In a mechanism for packing articles in a box with yielding walls, a chute down which the boxes drop and in which they are adapted to present an open side to the packing mechanism, a packing mechanism adapted to assemble the articles in a layer and to insert each layer as an entity into a box, mechanism adapted to lower the box, step by step, to receive successive layers, means for engaging the top wall of the open side of the box at the time of the insertion of the last layer, said means being operable in conjunction with the packing mechanism for automatically spreading the side walls of the box and for centering the box transversely in reference to the packing mechanism.

6. In a machine of the kind described, a chute down which the boxes pass, and in which they are adapted to present an open side to a packing mechanism, a packing mechanism adapted to insert successive layers of articles in the box as it descends the chute, mechanism for causing the filled box to fall rearwardly out of the chute when filled, and means for frictionally engaging the box as it falls to prevent it falling too rapidly.

7. In a machine of the kind described, a chute down which the boxes pass, and in which they are adapted to present an open side to a packing mechanism, a packing mechanism adapted to insert successive layers of articles in the box as it descends the chute, mechanism for causing the filled box to fall rearwardly out of the chute when filled, and spring bars adapted to engage the opposite ends of the box as it falls with a frictional engagement to prevent the box falling too rapidly.

8. In a machine for packing articles in boxes, having yielding walls and hinged closing flaps, a horizontal chute adapted to receive the boxes with the closure flaps of one side, viz, the top, folded back against the sides, and the closure flaps of the opposite side, viz, the bottom, folded in to form a closed bottom, the open top being presented toward one horizontal side, a vertical chute at the inner end of the horizontal chute, down which the boxes move to the packing mechanism, means for yieldingly engaging the forwardly folded-back flap for retaining it in folded back condition as the box enters the top of the vertical chute.

9. In a machine for packing articles in boxes, having yielding walls and hinged closing flaps, a horizontal chute adapted to receive the boxes with the closure flaps of one side, viz, the top, folded back against the sides, and the closure flaps of the opposite side, viz, the bottom, folded in to form a closed bottom, the open top being presented toward one horizontal side, a vertical chute at the inner end of the horizontal chute down which the boxes move to the packing mechanism, and a longitudinally movable rod arranged in alignment with the horizontal chute and adapted to engage the forward folded-back flap for holding it in folded back condition as the box enters the upper end of the vertical chute.

10. In a machine of the kind described, a packing plunger reciprocal at a uniform rate for forming a layer of articles from a succession of rows, a second plunger for carrying a formed layer forward, means for holding the second plunger raised out of the path of the first plunger, and means for dropping the second plunger before it begins its forward movement.

11. In a machine of the kind described, a packing plunger reciprocal at a uniform rate for forming a layer of articles from a succession of rows, a second plunger for carrying a formed layer forward, means for lifting the second plunger on its retrograde movement for passing over the layer being formed, means for retaining the second plunger raised adjacent to its most rearward position, and means for dropping the second plunger into the path of the first plunger before the second plunger begins its forward movement.

12. In a machine of the kind described, a packing plunger reciprocal at a uniform rate for forming a layer of articles from a succession of rows, a second plunger for carrying a formed layer forward, cam tracks associated with the second plunger for raising the second plunger in its retrograde movement to pass over the succeeding layer being formed, the second plunger being arranged to rest upon the rear ends of the cam tracks for holding the second plunger out of the path of the first plunger until a succeeding layer is formed, and means for drawing the second plunger off of said tracks to drop it into the path of the first plunger before the second plunger begins its forward movement.

13. In a machine of the kind described, a packing plunger for moving forward a single row of articles at right angles to the row, in combination with a retaining member movable back and forth with the plunger and adapted to engage the row opposite to the plunger as the plunger moves forward to hold the row in line, means for automatically lifting the retaining member as the plunger begins its retrograde movement, and means for again dropping the retaining member as the plunger begins its next forward movement.

14. In a machine of the kind described, a packing plunger for moving forward a single row of articles at right angles to the row, in combination with a retaining member movable back and forth with the plunger and adapted to engage the row opposite to the plunger as the plunger moves forward to hold the row in line, the retaining member pivotally mounted to swing up and down, a cam bar attached to the retaining member, the machine provided with a fixed cam slot through which the cam bar moves back and forth, the cam bar having cam surfaces for contact with the upper and lower walls of the cam slot for causing the retainer to be depressed as the plunger starts forward and to be lifted as the plunger starts rearward.

15. In a machine of the kind described, a packing plunger reciprocal at a uniform rate for forming a layer of articles from a succession of rows, a second plunger for carrying a formed layer forward, cam tracks associated with the second plunger for raising the second plunger in its retrograde movement to pass over the succeeding layer being formed, the forward ends of the cam tracks being pivoted to let them lift for permitting the second plunger to move forward in line with the first plunger and said pivoted ends adapted to drop down to cause the second plunger to ride up as it is drawn back to pass freely over the layer being formed.

16. In a machine of the kind described, a packing plunger for moving forward a single row of articles at right angles to the row, in combination with a retaining member movable back and forth with the plunger and adapted to engage the row opposite to the plunger as the plunger moves forward to hold the row in line, the retaining member pivotally mounted to swing up and down, a cam bar attached to the retaining member, the machine provided with a fixed cam slot through which the cam bar moves back and forth, the cam bar having cam surfaces for contact with the upper and lower walls of the cam slot for causing the retainer to be depressed as the plunger starts forward and to be lifted as the plunger starts rearward, and a stop for accurately setting the retainer at the rear limit of its movement.

17. In a machine of the kind described, having a chute down which boxes, to be filled with articles, move step by step, a horizontally disposed support plate adapted to receive the boxes after the first layer of articles have been inserted, a substantially vertically disposed support plate pivotally mounted, so that its upper edge can swing into the path of the boxes to support them at the proper height to receive the first layer, and means for forcing the second mentioned support plate back after the first layer is inserted and permitting the box to descend upon the horizontally disposed plate.

18. In a machine of the kind described, having a chute down which boxes, to be filled with articles, move step by step, means adapted to be disposed in the path of the boxes to support them in position to receive the first layer, means for removing said support after the first layer is inserted to drop the box, means for receiving the box as it drops and successively supporting the same at suitable heights to receive the successive layers, and means cooperating with said first mentioned support to force it inwardly beneath the next succeeding box to support it at the proper height to receive its first layer.

19. In a machine of the kind described, having a chute down which boxes, to be filled with articles, move step by step, means adapted to be disposed in the path of the boxes to support them in position to receive the first layer, means for removing said support after the first layer is inserted to drop the box, means for receiving the box as it drops and successively supporting the same at suitable heights to receive the successive layers, operating cam bars adapted to be engaged by a filled box, as it drops after being filled, and to force the first mentioned support inwardly against the upper end of the filled box to cause it to tip outwardly and to position said support beneath the next successive box.

20. In a machine of the kind described, having a chute down which boxes, to be filled with articles, move step by step, means adapted to be disposed in the path of the boxes to support them in position to receive the first layer, means for removing said support after the first layer is inserted to drop the box, means for receiving the box as it drops and successively supporting the same at suitable heights to receive the successive layers, operating cam bars adapted to be engaged by a filled box, as it drops after being filled, and to force the first mentioned support inwardly against the upper end of the filled box to cause it to tip outwardly and to position said support beneath the next successive box, the second mentioned support being adapted to tip outwardly with the filled box to deposit it upon a suitable carrier with its open side up.

21. In a machine of the kind described, having a chute down which boxes, to be filled with articles, move step by step, a horizontally disposed support plate adapted to receive the boxes after the first layer of articles have been inserted, a substantially vertically disposed support plate pivotally mounted, so that its upper edge can swing into the path of the boxes to support them at the proper height to receive the first layer, means for forcing the second mentioned support plate back after the first layer is inserted and permitting the box to descend upon the horizntally disposed plate, and means for yieldingly retaining said plate in each of its positions.

22. In a machine of the kind described, a chute down which a box drops as it is filled, a support for the box comprising a transversely extending member, end projections on the member, the machine being provided with vertical guide slots for said projections, swinging struts pivotally mounted to swing into and out of the path of said projections, and means for swinging said struts out of the path of said projections to let the box descend.

23. In a machine of the kind described, a chute down which a box drops as it is filled, a support for the box comprising a transversely extending member, end projections on the member, the machine being provided with vertical guide slots for said projections, successive pairs of swinging struts for engaging said projections to hold the box at successive heights to receive successive layers, and means for swinging the two struts of each pair out of the path of said projections to permit the box to descend, step by step, to receive successive layers.

24. In a machine of the kind described, a box support member movable downwardly, step by step, for positioning a box for receiving successive layers, means permitting said member to tip over to discharge a filled box from the machine, and counterbalancing means for returning said support member to its upper position when relieved from a filled box.

25. In a machine of the kind described, a box support member movable downwardly, step by step, for positioning a box for receiving successive layers, means permitting said member to tip over to discharge a filled box from the machine, counterbalancing means attached to said support member adapted to lift same from its discharge position to its box receiving position, and means for relieving said support of the major portion of said counterbalance as it approaches the upper limit of its movement.

26. In a machine of the kind described, a box support member movable downwardly, step by step, for positioning a box for receiving successive layers, means permitting said member to tip over to discharge a filled box from the machine, counterbalancing means engaging said support member adapted to apply its maximum effort to start the support upward, and means for relieving said support of a large fraction of said counterbalance as it approaches the upper limit of its movement, and holding it free of such major portion until it has dropped down at least one step.

27. In a machine of the kind described, a box support member movable downwardly, step by step, for positioning a box for receiving successive layers, means permitting said member to tip over to discharge a filled box from the machine, means for counterbalancing said support comprising a double weight attached thereto and adapted to lift the support after it has been freed from a filled box, said double weights being arranged, one below the other, the lower weight being adapted to be seated as the support approaches the upper limit of its movement to relieve the support of that portion of the counterbalance.

In testimony whereof, I have hereunto set my hand, this 22nd day of March, 1924.

EDDY T. McKAIG.